US012104626B1

(12) United States Patent
Mittal et al.

(10) Patent No.: US 12,104,626 B1
(45) Date of Patent: *Oct. 1, 2024

(54) FLUID FLOW CONDITIONING APPARATUS

(71) Applicant: University of South Florida, Tampa, FL (US)

(72) Inventors: Rajat Mittal, Tampa, FL (US); Dharendra Yogi Goswami, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,395

(22) Filed: Nov. 6, 2023

Related U.S. Application Data

(63) Continuation of application No. 17/556,423, filed on Dec. 20, 2021, now Pat. No. 11,808,290.

(60) Provisional application No. 63/199,292, filed on Dec. 18, 2020.

(51) Int. Cl.

| | |
|---|---|
| ***F15D 1/02*** | (2006.01) |
| ***F15D 1/06*** | (2006.01) |

(52) U.S. Cl.
CPC ................ *F15D 1/025* (2013.01); *F15D 1/06* (2013.01)

(58) Field of Classification Search
CPC .................................. F15D 1/06; F15D 1/025
USPC ..................................................... 138/45, 46
See application file for complete search history.

(56) References Cited

U.S. PATENT DOCUMENTS 11,808,290 B1 * 11/2023 Mittal ..................... F15D 1/025

* cited by examiner

*Primary Examiner* — David R Deal
(74) *Attorney, Agent, or Firm* — Nicholas Pfeifer; Smith & Hopen, P.A.

(57) ABSTRACT

A fluid flow conditioning apparatus having a plurality of flexible microstructures that reduce flow losses within a conduit. The plurality of microstructures is affixed to an insertion plate-type flow conditioner. One or more ends of the microstructures are secured to internal walls of the flow conditioner. The microstructures are configured to move and flex in response to static and dynamic pressure exerted onto the microstructures by the fluid flow. The microstructures may be made of a hyperelastic material configured to undergo an elastic deformation due to the dynamic pressure of the fluid flow.

20 Claims, 14 Drawing Sheets

FLUID FLOW CONDITIONING APPARATUS

PRIORITY CLAIM

This non-provisional patent application is a continuation of, and claims priority U.S. non-provisional application Ser. No. 17/556,423 filed Dec. 20, 2021, which claims priority to U.S. Provisional Application No. 63/199,292 filed Dec. 18, 2020.

BACKGROUND OF THE INVENTION

1. Field of the Invention

This invention relates to devices that condition fluid flow within a conduit. More specifically, the invention pertains to a fluid flow conditioning apparatus having a plurality of microstructures that reduce flow losses within a conduit.

2. Brief Description of the Related Art

As dependency on fossil fuels decreases, share of renewable energy sources—such as solar and wind—for power generation is growing. However, weather changes can cause fluctuations in renewable energy generation, strongly affecting reliability and availability of the renewable energy source. Thus, effective, and efficient energy storage systems are key to optimal utilization of renewable energy sources.

To counter intermittency and expand capacity of renewable solar energy resource for power generation, energy storage systems with easy grid integration are necessary. Thus, the need for long-term energy storage systems is increasing. Large energy storage systems help to stabilize the power grid by compensating for the energy generation fluctuations in real-time. Latent Heat Based Thermal Energy Storage (LHTES) systems can offset energy fluctuations experienced by the power grid. For this reason, there is an avid interest among researchers for inventing ways to decrease material usage, increase energy density, and reduce costs with respect to LHTES system.

Research shows that LHTES systems suffer from two major drawbacks. Firstly, non-uniform and slow charging rate of the energy storage capsules leads to higher heat losses. Secondly, increase in the pressure drop introduced in the flow conduit in the upstream section of the system contributes to the lowering and slowing down of the heat transfer from the heated airflow to the energy storage material within a tank. One of the key reasons for the decrease in the energy efficiency of the system is presence of fluid flow irregularities found in the upstream lengths of the tank due to a bend in the flow channel.

Currently known flow-conditioning devices, such as the one disclosed in US Pat. Pub. No. 2014/0338771, produce significant pressure drops when positioned in the flow channel, causing the fluid flow profile to resemble that of laminar flow. This fluid flow profile has high velocity heads in the center, thus making the flow profile uneven. Furthermore, these prior art devices develop a more parabolic and a less dispersed velocity profile—and, as a result, they exhibit decreased rate of heat transfer and charging of the system.

Controlling the flow of the heat transfer fluid through a heat exchanger with least possible expenditure of energy, while reducing maintenance requirements and extending life of the system is essential. Failing to control flow characteristics for the heat exchanger application leads to slow and uneven charging, reduced energy storage, damage caused due to corrosion and decrease in total system life. For efficient and productive operation, heat exchangers applications require stable upstream flow profiles in the fluid conduits before the heat transfer fluid enters the heat exchanger. Irregular and uneven flows at reduced pressures often result in decreased overall energy efficiency of the system and, thus, affect the rate and uniformity of the charging of the thermal energy storage.

Presence of inline elbows, which are commonly used to reduce straight pipe runs, due to space restrictions, result in generation of swirl and distortion in the velocity profile of the fluid flow within a pipeline. Flow distortion creates pressure changes in the system, reducing the net positive thermal energy gain. If not corrected, these flow distortions result in excess noise and system erosion, which lead to reduced life of heat exchanging tubes. An inline elbow flow conditioner can be installed upstream from the heat exchanger to ensure an optimal flow profile, for heat exchanger's its efficient operation. Flow profile distortions such as swirl, asymmetry, and non-flatness can be isolated in the pipeline to give rise to more repeatable, symmetrical, and relatively flat flow profiles with minimal losses in pressure.

Generation of more benign operating environments by providing conditioned flow streams entering at the inlet of the heat exchanger in an equally distributed pattern and uniformity enables in increasing the system life, reducing maintenance cost, noise, and risks to corrosion. Heat exchangers are adversely affected by flow disturbances occurring upstream of the flow conduit. Many flow conditioning applications are not designed with straight-run piping, for example, because of the imposed space constraints.

Therefore, what is needed is a novel flow conditioning apparatus configured to enhance and improve heat transfer characteristics for the system designed for high temperature heat exchanger applications, such as LHTES systems.

SUMMARY OF THE INVENTION

The problem stated above is now resolved by a novel and non-obvious fluid flow conditioning apparatus. In an embodiment, the fluid flow conditioning apparatus includes a first tabular member having a first leading edge, a first trailing edge, a first outer surface, and a first inner surface and a second tabular member having a second leading edge, a second trailing edge, a second outer surface, and a second inner surface. The leading edges of the first and the second tabular members are cojoined. When the conjoint tabular members are placed into a fluid flow, an angle between the first tabular member and the second tabular member is configured to decrease in response to increasing a Reynold's number of the fluid flow. Likewise, the distance between the first trailing edge of the first tabular member and the second trailing edge of the second tabular member is also configured to decrease as the Reynold's number of the fluid flow increases. In this manner, the cojoined tubular members are configured to adjust the shape of their collectively assembly based on the characteristics of the fluid flow—specifically, the static and dynamic pressure.

In an embodiment, the first and the second tabular members can be made of an elastomeric material, for example a hyperplastic material. The elastomeric material is configured to undergo an elastic deformation in response to a dynamic pressure of the first fluid flow being exerted onto the outer surfaces of the cojoined tabular members. In this manner, the elastic deformation of the elastomeric material reduces a drag coefficient of the cojoined tabular members. Furthermore, flexible tabular members can be configured to exhibit flapping in response to changes in dynamic pressure of the fluid flow. This flapping behavior of the tabular members generates vortices in the downstream fluid flow, thereby increasing intermixing thereof.

In an embodiment, the first tabular member and the second tabular member can be cojoined via a hinge. The hinge can be biased, such that the pressure exerted onto the outer surfaces of the tabular members by fluid flow partially closes the hinge against the biasing force. The biasing force is configured to at least partially open the hinge in response to a reduction in the pressure exerted onto the tabular members by the fluid flow. Furthermore, a biasing element—such as a spring—may be disposed at the hinge or between the cojoined tabular members. The biasing element biases the hinge toward an open configuration. In this embodiment, the pressure exerted onto the tabular members by the fluid flow at least partially closes the hinge against a biasing force of the biasing element. Furthermore, when tabular members are cojoined via a hinge, the tabular members may be flexible or rigid. In the case the tabular members are rigid, the tabular members will generate tip vortices in a downstream fluid flow, thereby increasing intermixing thereof.

The cojoined tabular members described above can be affixed to an insertion plate-type flow conditioner. In an embodiment, fibrous structures can be disposed within apertures of the insertion plate-type flow conditioner, such that the fibrous structures will facilitate creation of eddies within a downstream fluid flow.

Some embodiments of the fluid flow conditioning apparatus include an insertion plate-type flow conditioner having an outer perimeter established by an outer lateral wall and a plurality of apertures established by internal walls residing within the outer lateral wall. The flow conditioner further includes a plurality of microstructures disposed within each aperture of the insertion plate-type flow conditioner. Each microstructure has a first end, a second end, and a flexible body extending therebetween. In addition, the first end is secured to one of the internal walls of one of the plurality of apertures. Responsive to the flow conditioner being placed into a first fluid flow having a first Reynold's number and a first dynamic pressure, each of the plurality of flexible microstructures is configured to flex and move to alter flow characteristics of the first fluid flow downstream of the flow conditioner.

In some embodiments, the second end of each microstructure is secured to one of the internal walls of one of the plurality of apertures. In some embodiments, the first end of each microstructure is secured to one of the internal walls of one of the plurality of apertures at a location that is diametrically opposed to a location at which the second end is secured to one of the internal walls of one of the plurality of apertures.

In some embodiments, the second end of each microstructure remains free to flex and move within one of the plurality of apertures when the first fluid flow imparts a force on the microstructure, such that the flexing and movement of the second end generates vortices in the first fluid flow downstream of the flow conditioner, thereby increasing intermixing thereof. In addition, the flexible body of each microstructure can be configured to undergo an elastic deformation in response to changes in the dynamic pressure of the first fluid flow.

In some embodiments, the length of the flexible body of each microstructure is approximately equal to or less than half a distance from an opposing wall. In some embodiments, the length of the flexible body of each microstructure is between approximately half a distance from an opposing wall and a quarter of the distance from the opposing wall. In some embodiments, the thickness of the flexible body of each microstructure is approximately equal to 1/200 of a distance from an opposing wall.

Some embodiments include the flexible body of each microstructure having a density of approximately 1, a modulus of elasticity of approximately $10^6$ Pascals, a Poisson ratio of approximately 0.5, and/or a shear modulus in a range of approximately 0.3 Megapascals to approximately 2.5 Megapascals.

Some embodiments further include a plurality of channels disposed in an internal surface of the internal walls that establish the plurality of apertures, and an attachment structure secured at the first end of each of the microstructures. The attachment structure is configured to securely fit into one of the plurality of channels to secure the microstructures within the apertures.

The present invention further includes a method of altering the flow characteristics of a fluid flow. The method includes providing an insertion plate-type flow conditioner and inserting the flow conditioner into a first fluid flow. The provided plate-type flow conditioner includes an outer perimeter established by an outer lateral wall; a plurality of apertures established by internal walls residing within the outer lateral wall, wherein each aperture has a perimeter; and a plurality of microstructures disposed within each aperture of the insertion plate-type flow conditioner with each microstructure having a first end, a second end, and a flexible body extending therebetween and the first end secured to one of the internal walls of one of the plurality of apertures. Responsive to the flow conditioner being placed into the first fluid flow having a first Reynold's number and a first dynamic pressure, each of the plurality of flexible microstructures is configured to flex and move to alter the flow characteristics of the first fluid flow downstream of the flow conditioner.

In some embodiments, the method further includes the second end of each microstructure secured to one of the internal walls of one of the plurality of apertures and can include the first end of each microstructure secured to one of the internal walls of one of the plurality of apertures at a location that is diametrically opposed to a location at which the second end is secured to one of the internal walls of one of the plurality of apertures.

In some embodiments, the method further includes the second end of each microstructure remaining free to flex and move within one of the plurality of apertures when the first fluid flow imparts a force on the microstructure, such that the flexing and movement of the second end generates vortices in the first fluid flow downstream of the flow conditioner, thereby increasing intermixing thereof. In such embodiments, the length of the flexible body of each microstructure can be approximately equal to or less than half a distance from an opposing wall. Alternatively, the length of the flexible body of each microstructure can be between approximately half a distance from an opposing wall and a quarter of the distance from the opposing wall. In addition, the thickness of the flexible body of each microstructure can be approximately equal to 1/200 of a distance from an opposing wall.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized, and structural changes may be made without departing from the scope of the invention.

Figure 1A:
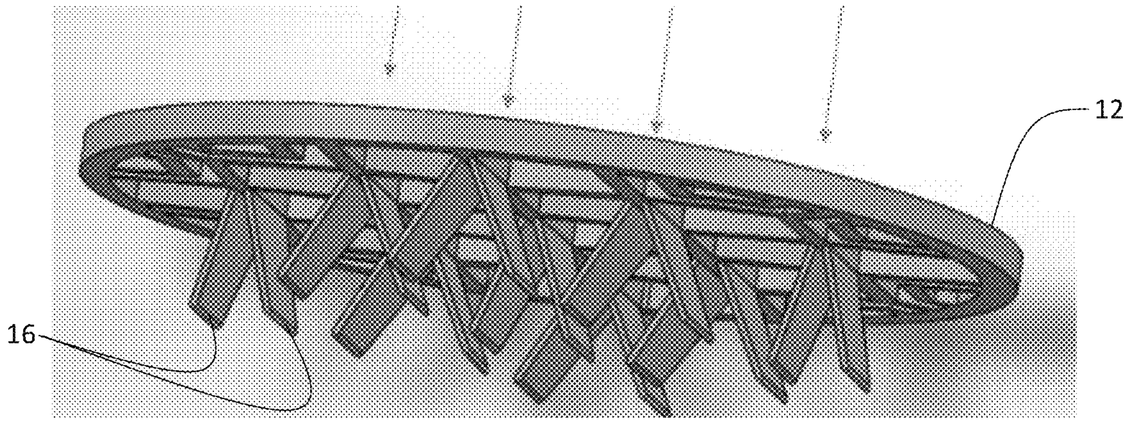
FIG. 1A (Prior Art)
FIG. 1A is a perspective side view of an insertion plate-type flow conditioner having stationary, rigid tabs for fluid flow conditioning.
Figure 1B:
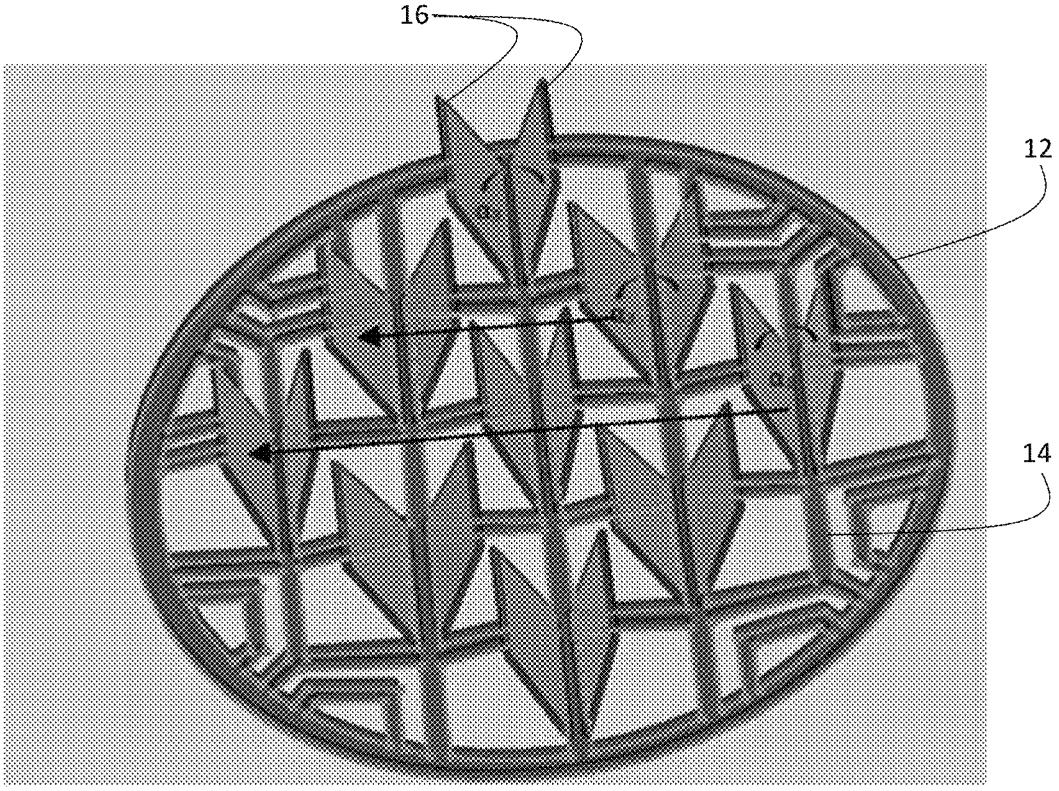
FIG. 1B (Prior Art)
FIG. 1B is a perspective bottom view of an insertion plate-type flow conditioner having stationary, rigid tabs for fluid flow conditioning.

FIGS. 1A and 1B depict an insertion plate-type flow conditioner 12 having a trapezoidal grid 14 and a plurality of tabs 16. Pairs of tabs 16 are arranged in an angular orientation relative to one another. FIG. 1B depicts three angles—$\alpha_1$, $\alpha_2$, and $\alpha_3$—between three pairs of tabs 16 positioned in three different locations relative to trapezoidal grid 14 of insertion plate flow conditioner 12.

Figure 2:
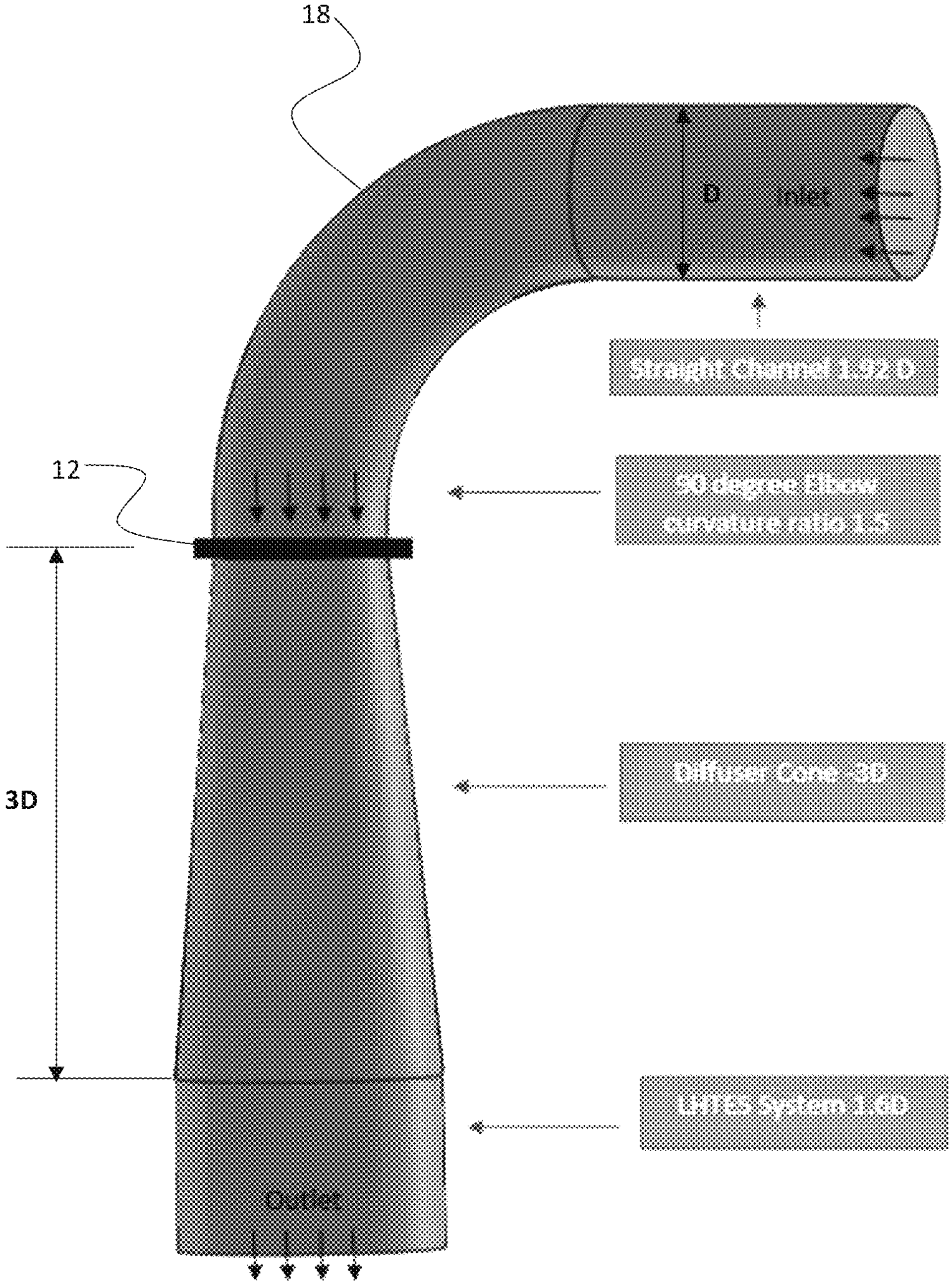
FIG. 2 is a schematic depiction of a conduit used to obtain data demonstrating efficiency of tab-pairs at various angles.

FIG. 2 shows an exemplary flow conduit 18. In this exemplary flow conduit 18, fluid flow passes through a straight circular channel of twelve inches in length. The flow conduit curves and forms a 90-degree bend in the same plane, with curvature ration value of 1.5. Diffuser cone of variable diameter connects the elbow to the inlet of the tank having an installation length of three diameters of the inlet channel. Insertion plate flow conditioner 12 is positioned in close proximity to the 90-degree bend.

Definition of Parameters

Horizontal and vertical flatness efficiency parameters have been defined to quantify the flatness of the flow profile, which is the difference between the fully developed and distorted flow profile for a flow conditioning system. Parameters $\sigma_h$ and $\sigma_v$ represent deviation in the effective flow profile of conduit 18. In the Table 1 below, $\sigma_h$ and $\sigma_v$ were measured at a distance three times the length of the diameter of conduit 18 from the bend, with the fully developed flow profile.

$$\sigma_h = \sqrt{\frac{\sum (U_h - U_{href})^2}{n}}$$

$$\sigma_v = \sqrt{\frac{\sum (U_v - U_{vref})^2}{n}}$$

Here, $U_{href}$, $U_{vref}$ and $U_h$, $U_v$ are the fully developed axial velocities and effective velocities in vertical and horizontal plane respectively with the flow conditioning device.

$$\eta_{h(z)} = \frac{\sigma'_{h_{i(z)}} - \sigma''_{h_{i(z)}}}{\sigma'_{h_{i(0)}} - \sigma'_{h_{i(z)}}}$$

$$\eta_{v(z)} = \frac{\sigma'_{v_{i(z)}} - \sigma''_{v_{i(z)}}}{\sigma'_{v_{i(0)}} - \sigma'_{v_{i(z)}}}$$

Variables $\sigma_{hi(z)}'$ and $\sigma_{hi(z)}''$ represent values of flatness efficiency calculated for the same system configuration with and without flow conditioner 12, wherein the distance z is evaluated as z=0 (placed immediately after the disturbance causing element, here elbow). Therefore, these parameters measure the relative efficiency of the flow-conditioning device with respect to the system without flow conditioner as the distance z from the piping element varies. Here, z equals to the length that is 3 diameters from the bend. Therefore, higher is the efficiency parameter for the conditioner, greater is its flow conditioning performance relative to the system without flow conditioning.

Next, variable $Pt_r$ is used to represent the relative pressure drop. $Pt_0$ (Eq. 2) is an area weighted average pressure at the inlet ($Pt_{01}$) and at three diameters from the bend ($Pt_2$), Refer FIG. 1 and $Pt_{01}$-$Pt_2$ is the total pressure drop between two sampling locations. $Pt_r$ is Relative Total Pressure Drop (Eq. 2).

Relative Total Pressure Drop for the section defines how much total pressure energy is lost with respect to the total inlet pressure energy.

$$\frac{Pt_{01} - Pt_{02}}{Pt_{01}} = Pt_r \quad \text{Eq. 1}$$

$$Pt_0 = \frac{\sum_{i=1}^{i=n} A_i Pt_{i0}}{\sum_{i=1}^{i=n} A_i} \quad \text{Eq. 2}$$

As the value of the parameter $Pt_r$ approaches zero, the pressure drops across the measurement section decreases, which means that more total energy is available at the inlet of the energy storage tank.

Figure 3A:
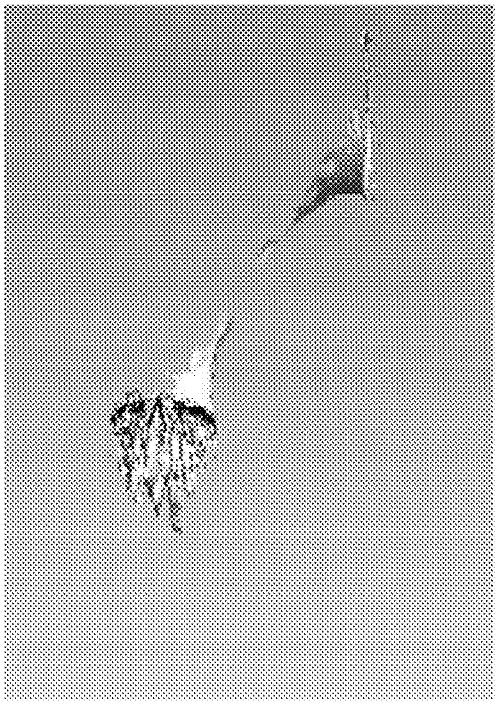
FIG. 3A is a model demonstrating the effects of the tabs on the downstream fluid flow.
Figure 3B:
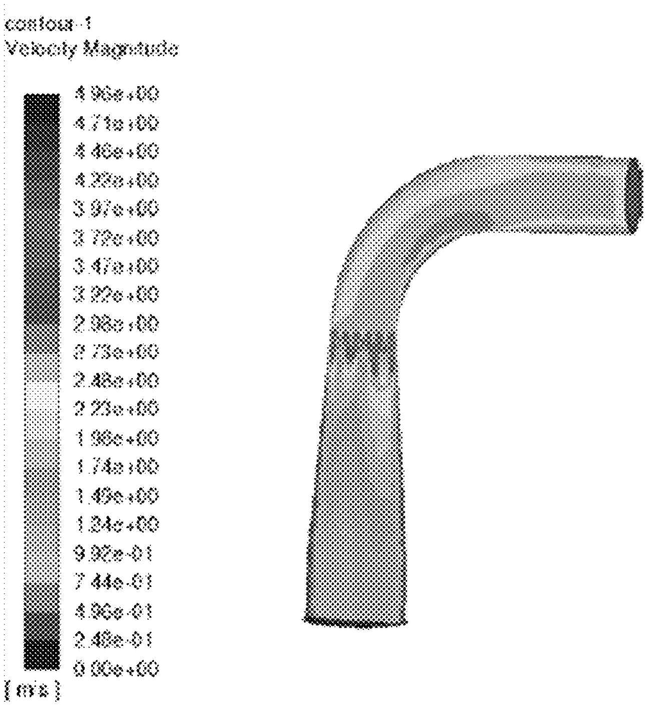
FIG. 3B is a model demonstrating velocity of fluid flow through the conduit.
Figure 3C:
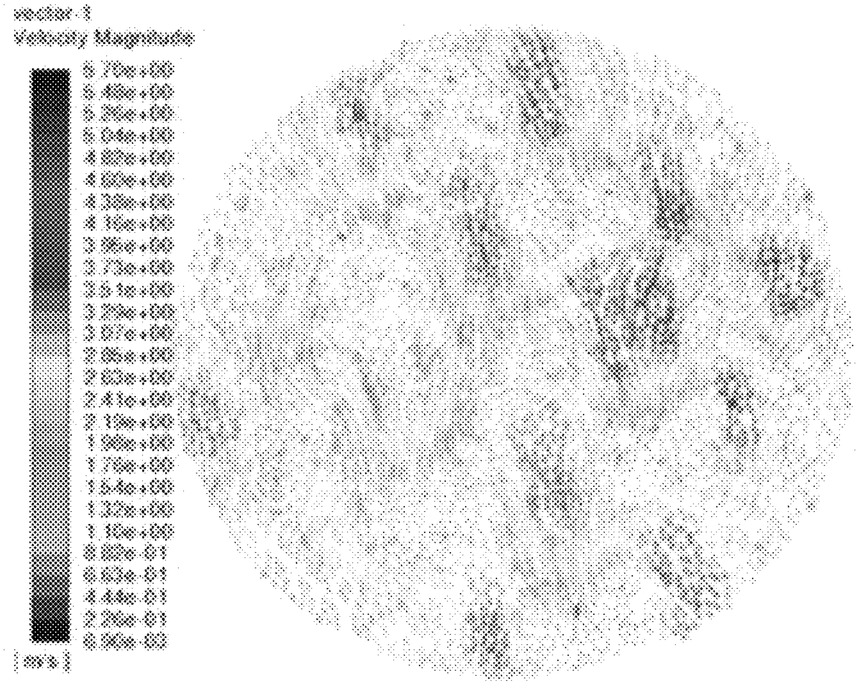
FIG. 3C is a model demonstrating formation of swirling vortices in the fluid flow due to the insertion-type plate flow conditioner.

FIGS. 3A-3C depict that tabs 16 effect the fluid flow by producing vortices. These vortices have axes of rotation directed toward the movement of the fluid. Vortices are moving in a counterclockwise direction, opposite to the direction of the swirl-attenuating flow anomalies stratified in the 90-degree bend. In this manner, tabs 16 facilitate intermixing of the fluid flow within conduit 18, downstream from insertion plate flow conditioner 12.

Next, Table 1 provided below shows that by changing at least one of the angles between tabs 16, the fluid flow downstream from flow conditioner 12 can be further adjusted. In Table 1, $\sigma_h$ and $\sigma_v$ represent the horizontal and vertical flatness efficiency parameters, used to quantify flatness of the flow profile, which is the difference between the fully developed and distorted flow profiles.

TABLE 1

| Angle values | $\sigma_h$ | $\sigma_v$ | $\eta_h$ | $\eta_h$ | $Pt_r$ |
|---|---|---|---|---|---|
| $\alpha_1 = 34$, $\alpha_2 = 50$, and $\alpha_3 = 40$ | 0.25 | 0.16 | 0.75 | 0.06 | 0.050 |
| $\alpha_1 = 45$, $\alpha_2 = 50$, and $\alpha_3 = 40$ | 0.25 | 0.18 | 0.75 | 0.04 | 0.056 |
| $\alpha_1 = 50$, $\alpha_2 = 50$, and $\alpha_3 = 40$ | 0.26 | 0.21 | 0.72 | 0.01 | 0.06 |

The results in Table 1 illustrate that relative efficiency of the flow conditioning process of insertion type flow conditioner 12 has been found relatively low, as the performance of the flow conditioner 12 is dependent on the angle between tabs 16. In addition, reducing the angle of tab 16 in the region of higher velocities aids in development of flatter fluid flow profile. However, angles for other tabs 16 need to be adjusted simultaneously to optimize vortex shedding and achieve minimal pressure drops. This is impossible to achieve with prior art devices, such as those depicted in FIGS. 1A and 1B, which use stationary, rigid tabs.

Insertion Type Flow Conditioner Having Self-Adjusting Tabs

As the data explained above shows, although rigid, non-adjustable tabs 16 of an insertion plate-type flow conditioner 12 improve fluid flow profile, their performance can be further optimized by if the individual angles between cojoined tabs 16 could be adjusted independently of one another based on the local fluid flow properties, such as static and dynamic pressure. However, in prior art flow conditioners, tabs 16 are rigidly affixed to the plate 12 at non-adjustable angles.

Figure 4:
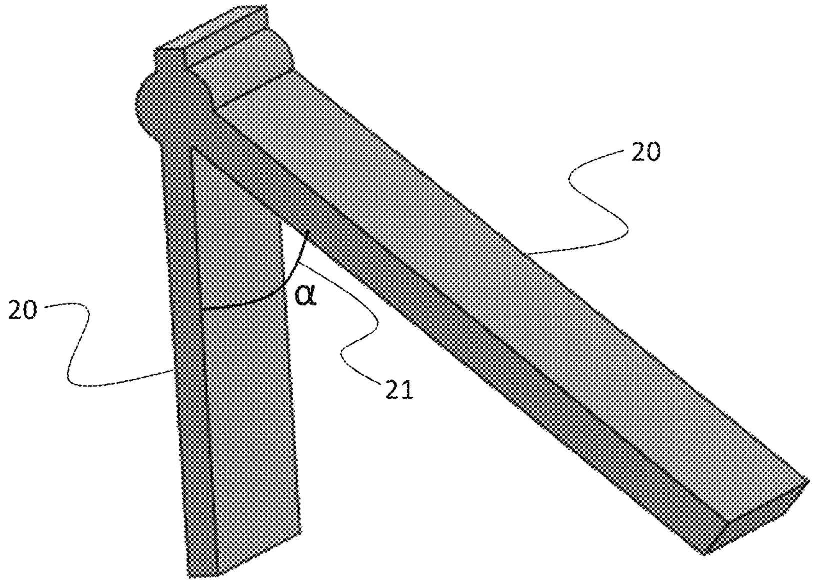
FIG. 4 is a perspective schematic view of a tabular member joined to a support surface.

This problem is now resolved by a novel and nonobvious invention, an embodiment of which is depicted in FIG. 4. A tab 20 is joined to a support surface 19—such as an inner wall of conduit 18 or insertion plate-type flow conditioner 12—an at angle 21. In an embodiment, angle 21 can range between 60 to 30 degrees with respect to the mean axis. At higher angles 21, the total pressure drop of the fluid passing through tab 20 increases. Conversely, when angle 21 between tab 20 and the support surface 19 decreases, the total pressure drop of the fluid flow also decreases. In an embodiment, tab 20 is made from elastomer material configured to undergo an elastic deformation in response to static and dynamic pressure exerted onto tab 20 by the fluid flow. In this manner, tab 20 is configured to bend in response to the change in total pressure of the fluid, which is the sum of dynamic and static pressure. When placed in the path of a fluid flow, angle 21 between tab 20 and the support surface 19 is controlled passively, meaning that tab 20 is configured to deform to orient itself in a shape of least resistance to the fluid flow. In an embodiment, tab 20 can be made from a hyperplastic or a flexible composite material.

Figure 5A:
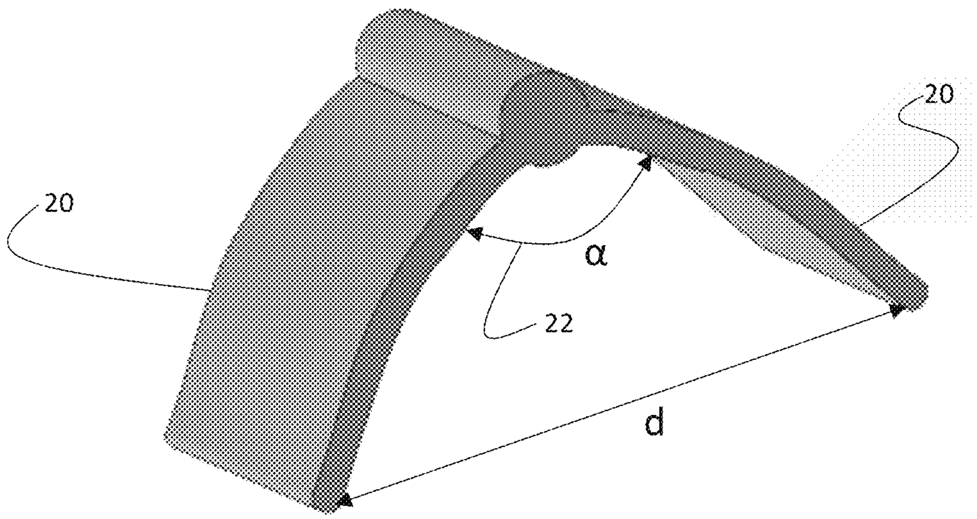
FIG. 5A is a perspective view of two conjoined tabular members in a non-deformed configuration.
Figure 5B:
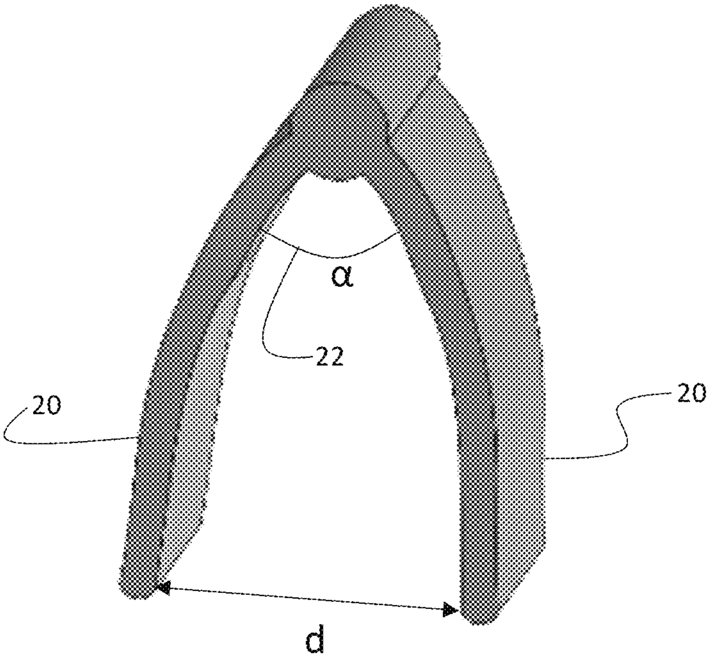
FIG. 5B is a perspective view of two conjoined tabular members in a deformed configuration.

FIGS. 5A and 5B depict an embodiment in which self-adjusting tabs 20 are cojoined together at angle 22. Analogously to the principles described above, angle 22 between tabs 20 is configured to change in response to changes in dynamic pressure exerted onto outer surfaces of tabs 20 by the fluid flow. In an embodiment, angle 22 between tabs 20 can vary in the range between 60 to 30 degrees with respect to the mean axis. At higher angles 22, the total pressure drop of the fluid passing through tabs 20 increases. Conversely, when angle 22 between tabs 20 decreases, the total pressure drop of the fluid flow also decreases.

As described above with respect to FIG. 4, in the embodiment depicted in FIGS. 5A and 5B, tabs 20 can be manufactured from an elastomeric material configured to undergo an elastic deformation in response to static and dynamic pressure exerted onto tabs 20 by the fluid flow. In this manner, tabs 20 are configured to bend inwardly in response to the change in total pressure of the fluid, which is the sum of dynamic and static pressure. In this embodiment, cojoined tabs 20 can be manufactured as a monolithic component. When placed in the path of a fluid flow, angle 22 at the vertex of cojoined tabs 20 is controlled passively because cojoined tabs 20 are configured to deform to orient themselves in a shape of least resistance to the fluid flow. In an embodiment, cojoined tabs 20 can be made from a hyperplastic or a flexible composite material.

Figure 5C:
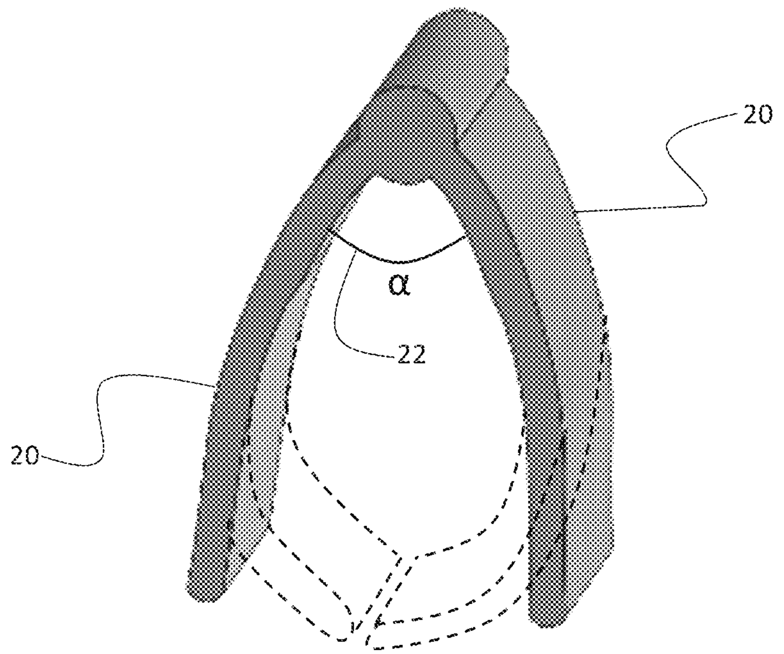
FIG. 5C is a schematic view depicting that tabular members are configured to elastically deform to achieve a collective shape resembling a teardrop shape of an airfoil.

As depicted in FIG. 5C, when subjected to the pressure of the fluid flow, cojoined tabs 20, undergo an elastic deformation to assume a shape approaching a teardrop-shape of an airfoil. This shape of cojoined tabs 20, depicted in FIG. 4B, results in less resistance and improved streamline to the motion of the fluid, relative to the default shape depicted in FIG. 4A. Furthermore, because each cojoined pair of tabs 20 deforms independently of other pairs of tabs 20, every cojoined pair of tabs 20 can achieve a different angle corresponding to the localized dynamic pressure of the fluid flow at that specific location relative to plate-type flow conditioner 12.

If the characteristics of the upstream fluid flow change, angles 22 between each cojoined pair of tabs 20 will passively (without requiring any external input) readjust based on the instantaneous pressure the fluid flow exerts on each tab-pair 20 at that instance. Thus, if the velocity of the upstream fluid flow decreases, the static and dynamic pressure exerted onto tabs 20 by the fluid flow will also decrease—in which case, the tabs 20 will partially straighten, increasing angle 22 therebetween. Conversely, as the pressure of the upstream fluid flow increases, tabs 20 will bend more, decreasing angle 22 therebetween. These adjustments are achieved passively, based on the static and dynamic pressure of the fluid flow, without requiring any manual adjustment of tabs 20 or involvement of sensors and motors to actively control angles 22 therebetween. Furthermore, the trailing edges of tabs 20 can have a tapered—i.e., airfoil-like shape—to reduce the pressure drop as the fluid flow passes over the cojoined tabs 20.

In this manner, tabs 20 are configured to self-adjust in response to change in Reynold's number of the fluid around tabs 20. As the Reynold's number of the fluid flow increases, the dynamic pressure exerted by the fluid onto the surface areas of tabs 20 also increases, causing the tabs 20 to bend inwardly. As tabs 20 undergo elastic deformation angle 22 between them decreases. In this manner, each cojoined pair of tabs 20 achieves a configuration that offers minimal resistance to fluid flow, thereby decreasing the pressure drop through the flow-conditioning device 12. Furthermore, another advantage of flexible tabs 20 is that, when subjected to turbulent flow, they will "flap" in response to the dynamic pressure of the fluid flow, thus facilitating intermixing of the fluid downstream.

The properties of the material from which tabs 20 are made dictates the amount of elastic deformation that tabs 20 will undergo in response to the total pressure exerted by the fluid flow. The material will bend and tabs 20 will streamline themselves approaching a shape of an airfoil, thereby reducing the total resistance of cojoined tabs 20, and therefore, the drag forces that cojoined tabs 20 will experience from the fluid. Furthermore, elasticity of the material enables tabs 20 to exhibit flapping, which helps generate vortices to perform fluid intermixing.

Figure 6A:
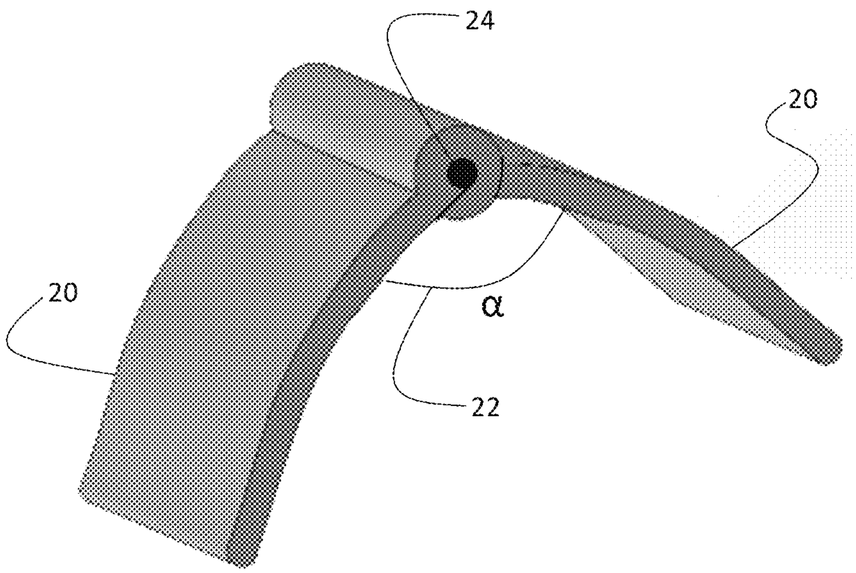
FIG. 6A is a perspective view of two conjoined tabular members connected via a hinge in an open configuration.
Figure 6B:
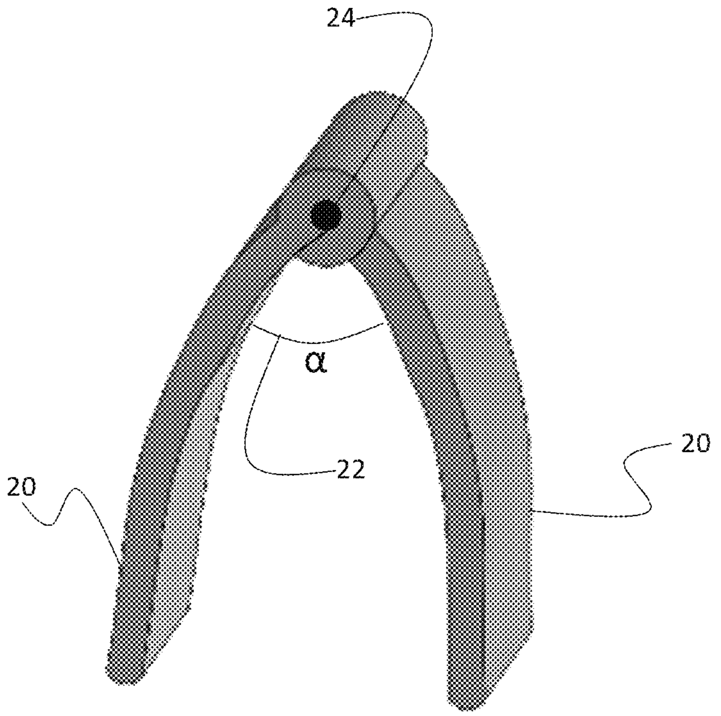
FIG. 6B is a perspective view of two conjoined tabular members connected via a hinge in a partially closed configuration.

In an embodiment depicted in FIGS. 6A-6B, pair of tabs 20 are cojoined via a hinge 24. (Hinge 24 can also be used to join a single tab 20 to support surface 19, with the principles described below being applicable to the embodiment depicted in FIG. 4). The resistance of hinge 24 dictates the change in angle 22 due to increase in pressure exerted onto tabs 20 by the fluid flow. In addition, hinge 24 may be biased (for example, spring-loaded). When using biased hinge 24, the pressure exerted by the fluid flow onto tabs 20 will counteract the biasing force, thereby partially closing hinge 24 to reduce angle 22 between tabs 20. When the pressure of the fluid flow decreases, the biasing force of hinge 24 will cause tabs 20 to pivot outward about the hinge axis, thereby increasing angle 22 therebetween. In this embodiment, tabs 20 may be made of a rigid material because angle 22 is controlled by hinge 24 and is not dependent solely on elastic deformation of tabs 20.

Figure 7A:
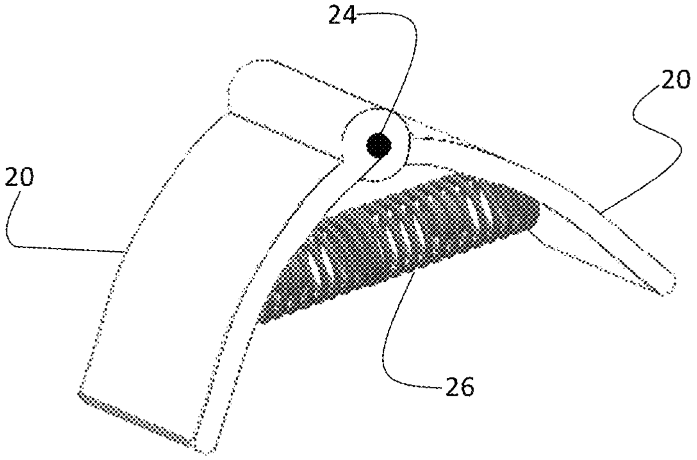
FIG. 7A is a schematic view of two conjoined tabular members connected via a hinge and a biasing element, in an open configuration.
Figure 7B:
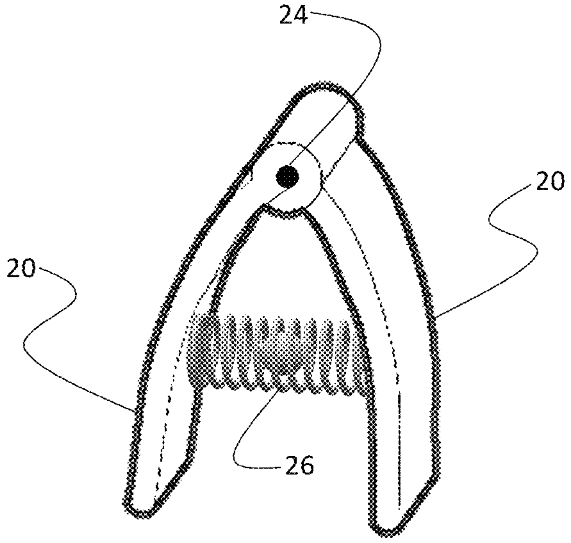
FIG. 7B is a schematic view of two conjoined tabular members connected via a hinge and a biasing element, in a partially closed configuration.

Yet another embodiment is depicted in FIGS. 7A-7B. In this embodiment, a biasing element 26—for example, a spring—is positioned between adjacent tabs 20. (Biasing element 26 can also be implemented with a single-tab embodiment depicted in FIG. 4 by disposed biasing element 26 between tab 20 and support surface 19). In this embodiment, Hooke's constant (stiffness) of biasing element 26 will dictate the amount by which angle 22 changes in response to an increase or a decrease in pressure exerted onto tabs 20 by the fluid flow. As the pressure of fluid flow onto surface areas of tabs 20 increases, biasing element 26 will compress, reducing angle 22 between tabs 20. Conversely, as the pressure exerted onto tabs 20 by the fluid flow decreases, the biasing force of biasing element 26 will push tabs 20 further apart, increasing angle 22 therebetween. Even in the embodiments that involve hinge 24 and/or biasing element 26, tabs 20 may be made from an elastomer (hyperplastic) material to facilitate flapping behavior in response to changes in dynamic pressure of the fluid flow. Alternatively, in this embodiment, tabs 20 can be rigid, in which case they will generate tip vortices in the downstream fluid flow.

Additional Fluid Flow Conditioning Mechanisms

Figure 8A:
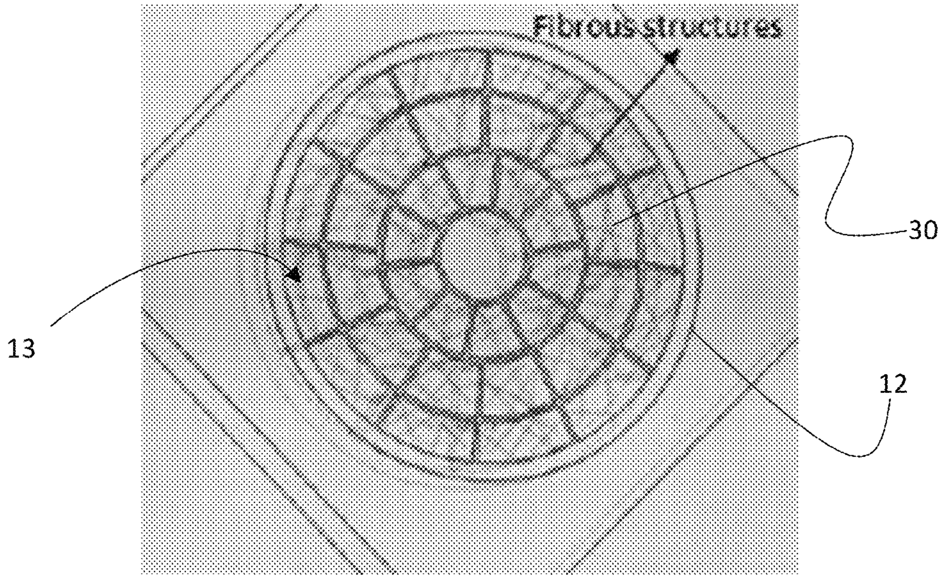
FIG. 8A is a schematic view depicting fibrous structures disposed within apertures of the plate-type flow conditioner.

FIG. 8A depicts flexible microstructures 30 positioned in and across passages 13 of a fluid flow conditioning plate 12. Flexible microstructures 30 inhibit formation of laminar boundary flow at flow bounding surfaces, and therefore reduce pressure losses in downstream fluid flow. Initially, as the fluid flow passes over the boundary walls of the conditioning plate 12, the laminar boundary flow experiences separation from the surface due to the presence of adverse pressure gradient. This leads to the development of recirculation regions within the volume of passage 13. These recirculation zones extract energy from the freestream fluid, creating pressure drops as the fluid flow passes through plate 12.

Figure 8B:
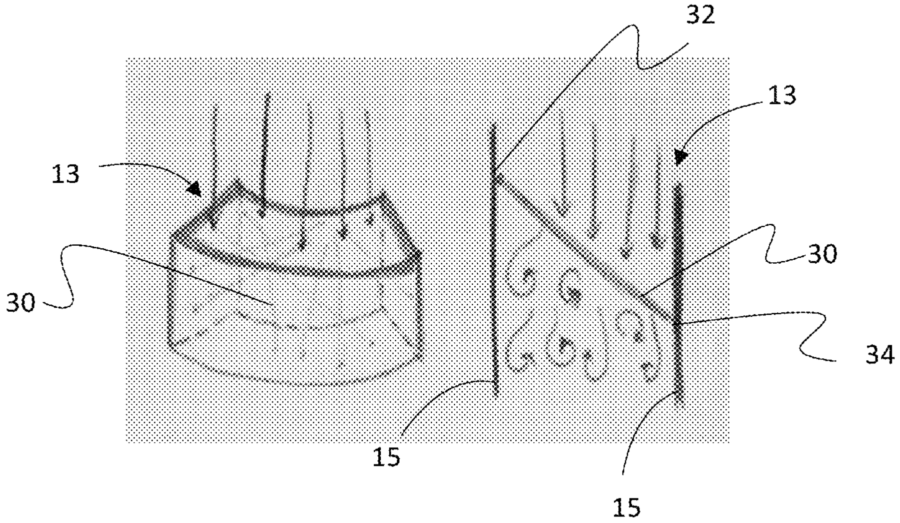
FIG. 8B is a schematic view depicting fibrous structures facilitating generation of eddies in a downstream fluid flow.

FIG. 8B depicts that flexible microstructures 30 running in and across the volume of the apertures/passages 13 within plate 12 function as bluff bodies in the flow direction, thereby aiding in the creation of eddies. The swirling eddies in the downstream flow prevent the flow from becoming laminar in the boundary flow region, due random intermixing of fluid particles, enhanced by eddy formation.

Figure 9A:
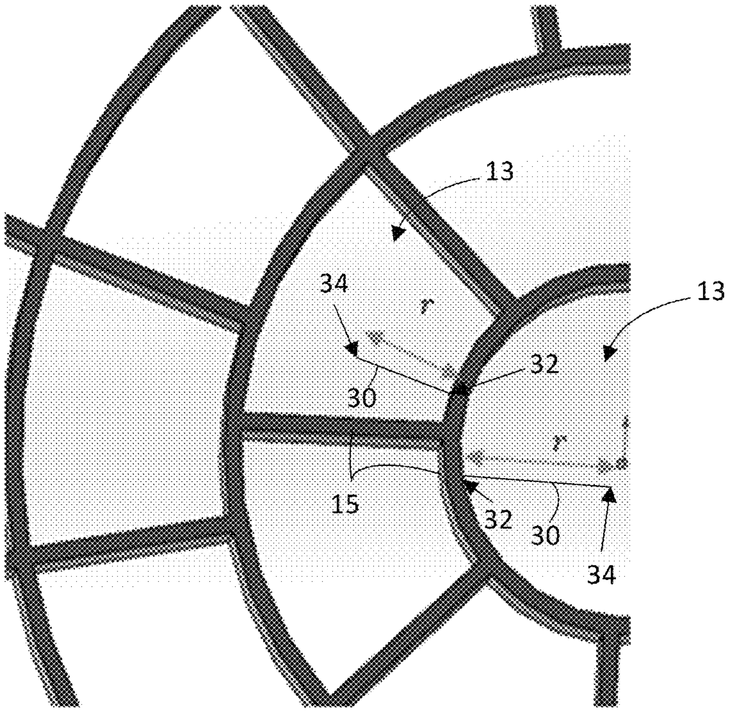
FIG. 9A is a close-up view of the plate type flow conditioner of FIG. 8 with all but two of the microstructures removed to depict the length of the microstructures in accordance with some embodiments of the present invention.

Each microstructure 30 includes first end 32 and second end 34 with an elongated flexible body section 36. In some embodiments, as depicted in FIG. 8B, both first end 32 and second end 34 are secured to internal walls 15 of passages 13. However, some embodiments, as depicted in FIG. 9A, include first end 32 secured to one of the internal walls 15 of passage 13 while second end 34 remains free to move and "flap" in the flow passing through passage 13. It should be noted that FIG. 9A only depicts two microstructures 30, with each residing in a separate passage 13. This depiction purposefully includes a limited number of microstructures to help discern the length of the microstructures. Typically, each passage 13 would include a plurality of microstructures as depicted in FIG. 8A.

For embodiments employing microstructures 30 with a free second end 34 (hereinafter referred to as "free-end microstructures"), the length of each free-end microstructure 30 is approximately less than or equal to the radius of the orifice/trapezoidal cavity as shown in FIG. 9A. In some embodiments, the length of each free-end microstructure 30 is between approximately half the radius of passage 13 and the radius of passage 13. The same length ranges apply to passages 13 when first end 32 is secured to a non-curved wall 15 or when passages 13 are in a non-circular or non-trapezoidal shape. For example, the length of each free-end microstructure 30 is less than or equal to half the distance between opposing walls 15 of a passage or the length is between approximately half the distance between opposing walls 15 and a quarter of the distance between opposing walls 15.

The preceding lengths of free-end microstructures 30 ensure that free ends 34 extend up to a region of higher fluid pressure so that free-end microstructures 30 can transfer the energy from the high-pressure region to the region where the pressure is low to create a more even flow profile. Free ends 34 of free-end microstructures 30 through its "flapping/oscillating" movement will transfer higher energy to the fluid layers closer to the surface providing them with greater energy.

Figure 9B:
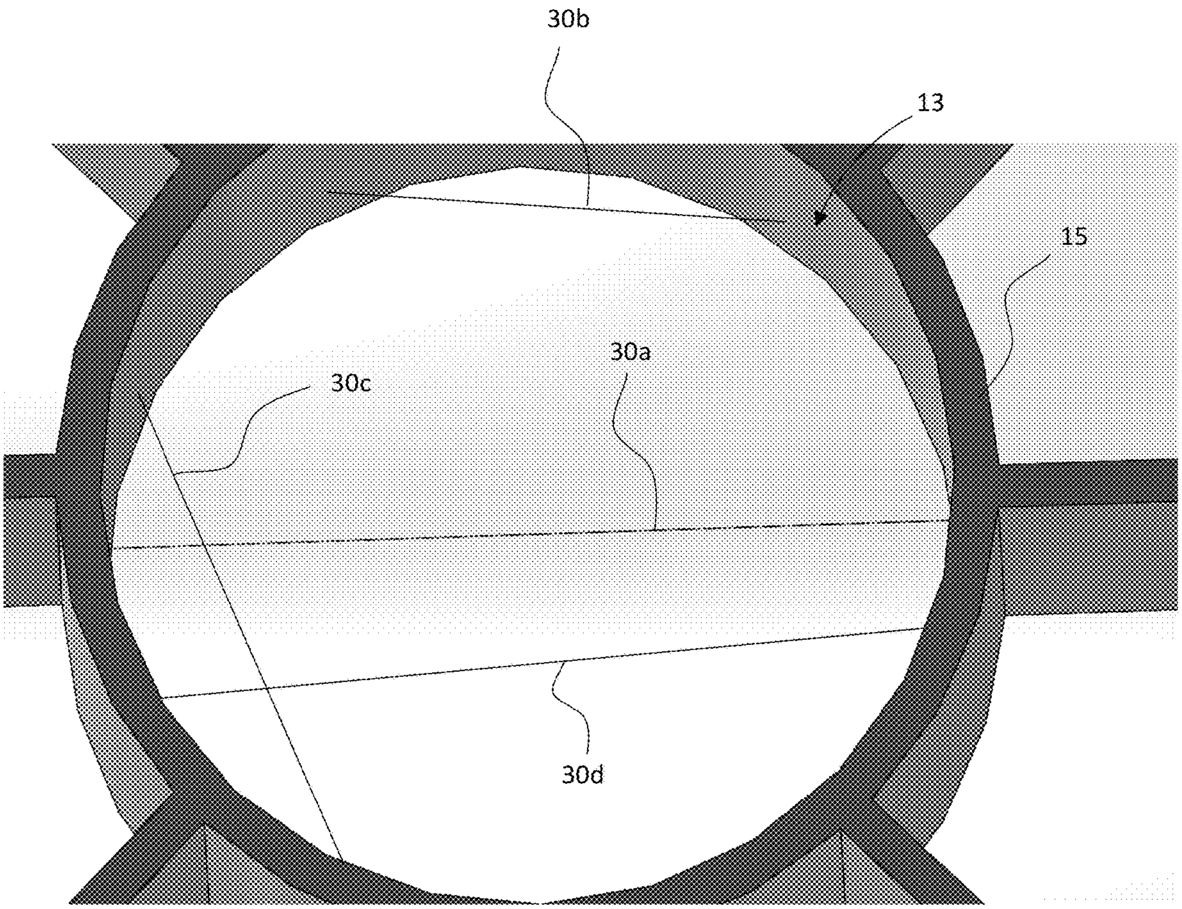
FIG. 9B is a close-up view of a passage with a plurality of microstructures secured within the passage in accordance with an embodiment of the present invention.

In embodiments in which both ends 32 and 34 of microstructures 30 (referred to hereinafter as "bound microstructures") are secured to walls 15 within a passage 13, the length of each microstructure 30 can be defined by the distance between the two attachment points or between the two walls 15. It should be noted that while bound microstructures can expand across a passage 13 in a diametric manner as exemplified by microstructure 30*a* in FIG. 9B, microstructures can also expand less than the diameter of passage 13 as exemplified by microstructures 30*b*, 30*c* and 30*d*, and at various angles (i.e., not necessarily in the same plane as the lateral plane of plate 12) as depicted in FIG. 8B.

In some embodiments microstructures 30 are arranged within each passage 13 in a manner to establish equidistant spacing relative to a certain cross-sectional area in each passage 13. This can be achieved through any mathematical approaches to equally segment passage 13 and calculate a consistent volume of microstructures 30 within each segment. However, some embodiments will include microstructures 30 randomly secured within passages 13.

While some embodiments include only bound microstructures, some embodiments include only free-end microstructures, and some embodiments include a mixture of bound microstructures and free-end microstructures. When both types of microstructures are used, some embodiments include both types in a single passage while other embodiments include some passages having only bound microstructures with other passages having only free-end microstructures.

The thickness or diameter of each microstructure 30 is generally equal to or less than 1/100 of the radius or 1/100 of half the distance between opposing walls 15 of a passage 13 (i.e., 0.005 the distance between opposing walls 15 of a passage 13). The thickness of each microstructure 30 should not be so great that the thickness offers too much resistance to the flow passing through passage 13 thus blocking the flow and creating pressure losses. Thicknesses greater than 1/100 of the radius or 1/200 (i.e., 0.005) of the distance between opposing walls of a passage are more likely to offer increased resistance and reduced mixing behavior resulting from the flapping or vibration of microstructures 30.

Moreover, each microstructure 30 is comprised of material having hyperelastic properties like rubber or other elastomers. In some embodiments, each microstructure 30 has a density of approximately 1, a modulus of elasticity of approximately $10^6$ Pascals, a Poisson ratio of approximately 0.5, and/or a shear modulus in a range of approximately 0.3 Megapascals to approximately 2.5 Megapascals.

Referring now to FIGS. 10, in some embodiments, microstructures 30 can be attached to walls 15 through semispherical slots or channels 38 disposed within the surface of walls 15. Each slot 38 is configured to securely receive a corresponding hemispherical attachment structure 40 secured to one or both ends 32, 34 of microstructures 30. Slots 38 can be sized to create a friction fit with attachment structure 40 or slot 38 can include a retention shoulder to prevent attachment structure 40 from exiting slot 38 due to tension forces directed towards the center of passage 13.

Figure 10A:
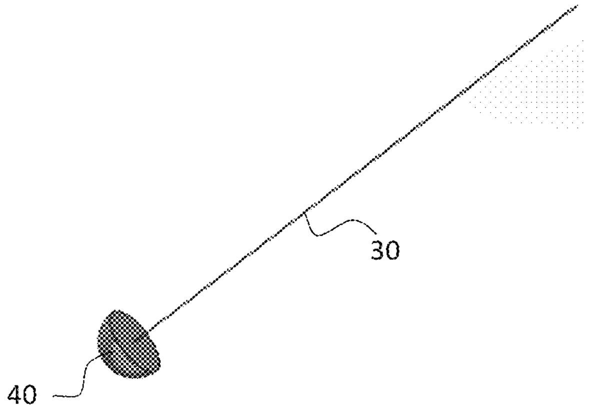
FIG. 10A is a perspective view of an embodiment of a microstructure.
Figure 10B:
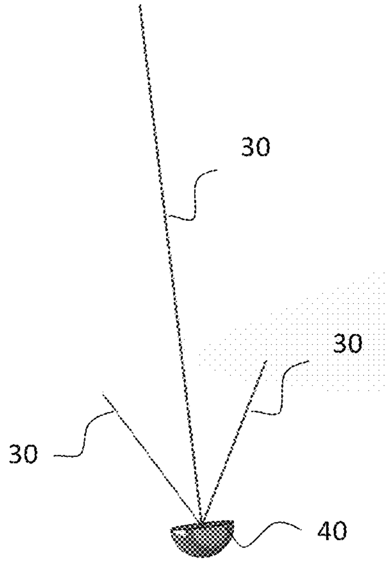
FIG. 10B is a perspective view of an embodiment of a microstructure.
Figure 10C:
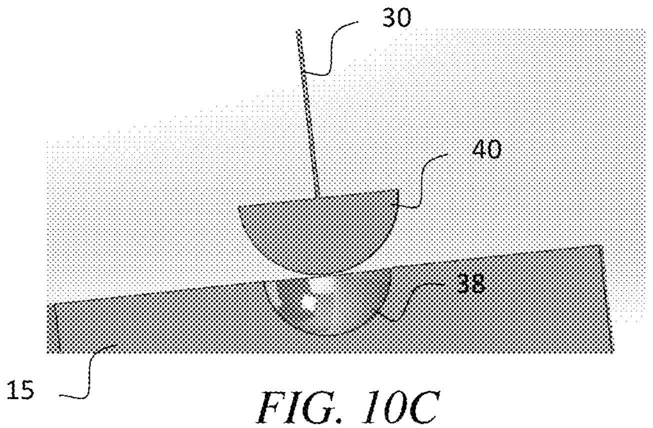
FIG. 10C is a close-up view of an embodiment of a microstructure just prior to insertion of the attachment structure into a retention channel.
Figure 10D:
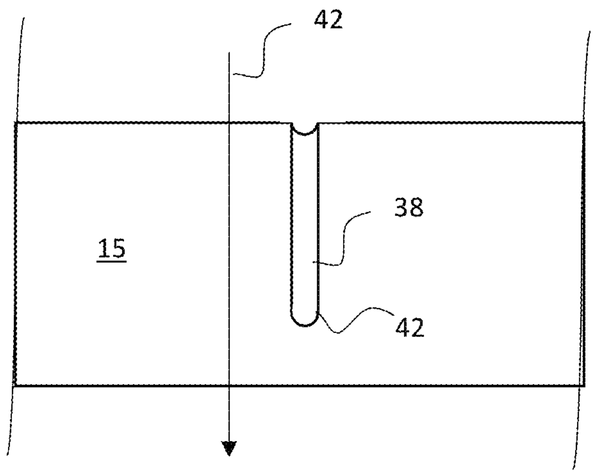
FIG. 10D is a close-up view of an embodiment of a passage depicting an exemplary retention channel in accordance with an embodiment of the present invention.

Slots 38 can be used to hold attachment structure 40 for both bound and free-end microstructures 30 to walls 15. In addition, attachment structure 40 can be secured to one or multiple microstructures 30 in different arrangements as shown in FIG. 10B.

In some embodiments, slots 38 can also start upstream on plate 12 within walls 15 and extend partially towards the downstream side (arrow 42 in FIG. 10D indicates a downstream direction) of plate 12 but terminate prior to extending all the way through wall 15 to the downstream side. As fluid flows downstream (represented by arrow 42), the force of the flow secures attachment structure 40 at the terminal point 44 of channel 38.

While the exemplary attachment structure 40 is shown and described as hemispherical and the exemplary slot 38 is semispherical, alternative corresponding shapes can be used to temporarily or permanently secure attachment structure 40 within slot 38. In addition, alternative approaches and devices can be used to secure the one or more ends 32, 34 of microstructures 30 to one or more walls 15 of passages 13. The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A fluid flow conditioning apparatus, comprising:
- an insertion plate-type flow conditioner, the plate-type flow conditioner including:
  - an outer perimeter established by an outer lateral wall;
  - a plurality of apertures established by internal walls residing within the outer lateral wall, wherein each aperture has a perimeter;
- a plurality of microstructures disposed within each aperture of the insertion plate-type flow conditioner, each microstructure having a first end, a second end, and a flexible body extending therebetween, wherein the first end is secured to one of the internal walls of one of the plurality of apertures;
- wherein, responsive to the flow conditioner being placed into a first fluid flow having a first Reynold's number and a first dynamic pressure, each of the plurality of flexible microstructures is configured to flex and move to alter flow characteristics of the first fluid flow downstream of the flow conditioner.

2. The fluid flow conditioning apparatus of claim 1, wherein the second end of each microstructure is secured to one of the internal walls of one of the plurality of apertures.

3. The fluid flow conditioning apparatus of claim 2, wherein the first end of each microstructure is secured to one of the internal walls of one of the plurality of apertures at a location that is diametrically opposed to a location at which the second end is secured to one of the internal walls of one of the plurality of apertures.

4. The fluid flow conditioning apparatus of claim 1, wherein the second end of each microstructure remains free to flex and move within one of the plurality of apertures when the first fluid flow imparts a force on the microstructure, such that the flexing and movement of the second end generates vortices in the first fluid flow downstream of the flow conditioner, thereby increasing intermixing thereof.

5. The fluid flow conditioning apparatus of claim 4, wherein a length of the flexible body of each microstructure is approximately equal to or less than half a distance from an opposing wall.

6. The fluid flow conditioning apparatus of claim 4, wherein a length of the flexible body of each microstructure is between approximately half a distance from an opposing wall and a quarter of the distance from the opposing wall.

7. The fluid flow conditioning apparatus of claim 4, wherein a thickness of the flexible body of each microstructure is approximately equal to 1/200 of a distance from an opposing wall.

8. The fluid flow conditioning apparatus of claim 1, wherein the flexible body of each microstructure is configured to undergo an elastic deformation in response to changes in the dynamic pressure of the first fluid flow.

9. The fluid flow conditioning apparatus of claim 1, wherein the flexible body of each microstructure has a density of approximately 1.

10. The fluid flow conditioning apparatus of claim 1, wherein the flexible body of each microstructure has a modulus of elasticity of approximately $10^6$ Pascals.

11. The fluid flow conditioning apparatus of claim 1, wherein the flexible body of each microstructure has a Poisson ratio of approximately 0.5.

12. The fluid flow conditioning apparatus of claim 1, wherein the flexible body of each microstructure has a shear modulus in a range of approximately 0.3 Megapascals to approximately 2.5 Megapascals.

13. The fluid flow conditioning apparatus of claim 1, further including:

- a plurality of channels disposed in an internal surface of the internal walls that establish the plurality of apertures;
- an attachment structure secured at the first end of each of the microstructures, wherein the attachment structure is configured to securely fit into one of the plurality of channels to secure the microstructures within the apertures.

14. A method of altering the flow characteristics of a fluid flow, comprising:

- providing an insertion plate-type flow conditioner, the plate-type flow conditioner including:
  - an outer perimeter established by an outer lateral wall;
  - a plurality of apertures established by internal walls residing within the outer lateral wall, wherein each aperture has a perimeter;
  - a plurality of microstructures disposed within each aperture of the insertion plate-type flow conditioner, each microstructure having a first end, a second end, and a flexible body extending therebetween, wherein the first end is secured to one of the internal walls of one of the plurality of apertures;
- inserting the flow conditioner into a first fluid flow, wherein, responsive to the flow conditioner being placed into the first fluid flow having a first Reynold's number and a first dynamic pressure, each of the plurality of flexible microstructures is configured to flex and move to alter the flow characteristics of the first fluid flow downstream of the flow conditioner.

15. The method of claim 14, wherein the second end of each microstructure is secured to one of the internal walls of one of the plurality of apertures.

16. The method of claim 15, wherein the first end of each microstructure is secured to one of the internal walls of one of the plurality of apertures at a location that is diametrically opposed to a location at which the second end is secured to one of the internal walls of one of the plurality of apertures.

17. The method of claim 14, wherein the second end of each microstructure remains free to flex and move within one of the plurality of apertures when the first fluid flow imparts a force on the microstructure, such that the flexing and movement of the second end generates vortices in the first fluid flow downstream of the flow conditioner, thereby increasing intermixing thereof.

18. The method of claim 17, wherein a length of the flexible body of each microstructure is approximately equal to or less than half a distance from an opposing wall.

19. The method of claim 17, wherein a length of the flexible body of each microstructure is between approximately half a distance from an opposing wall and a quarter of the distance from the opposing wall.

20. The method of claim 17, wherein a thickness of the flexible body of each microstructure is approximately equal to $1/200$ of a distance from an opposing wall.

* * * * *